Dec. 22, 1925.
R. KLEIN
1,566,542
PHOTOGRAPHIC SHUTTER
Filed July 16, 1924   3 Sheets-Sheet 1
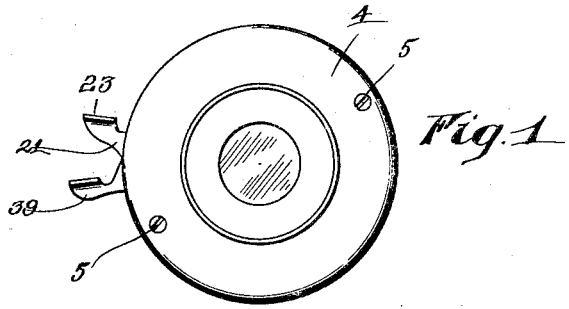
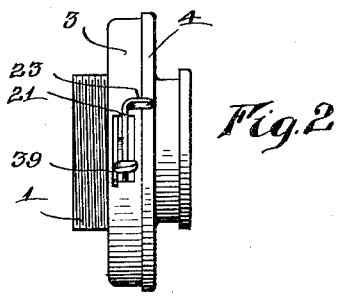
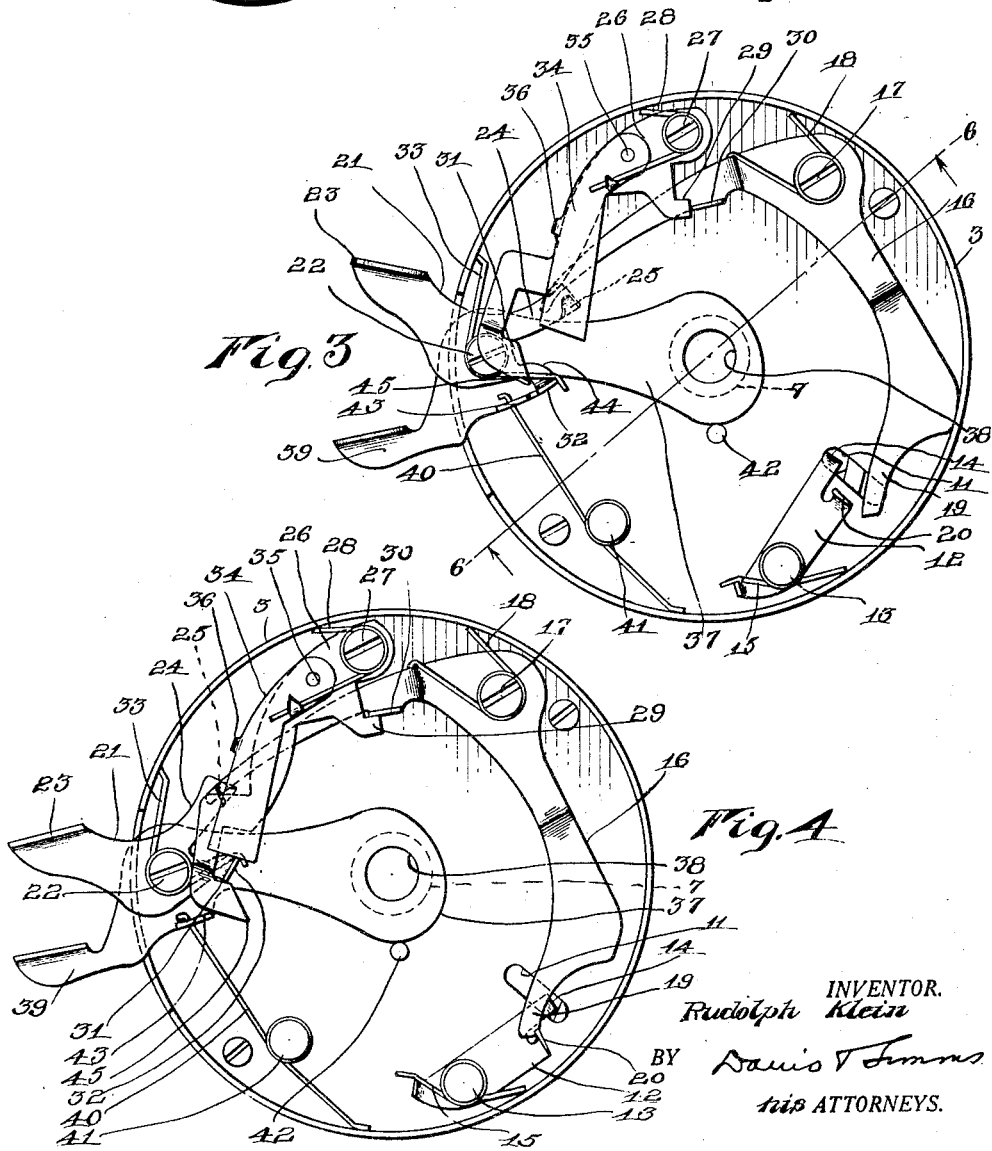
INVENTOR.
Rudolph Klein
BY Davis & Timms
his ATTORNEYS.

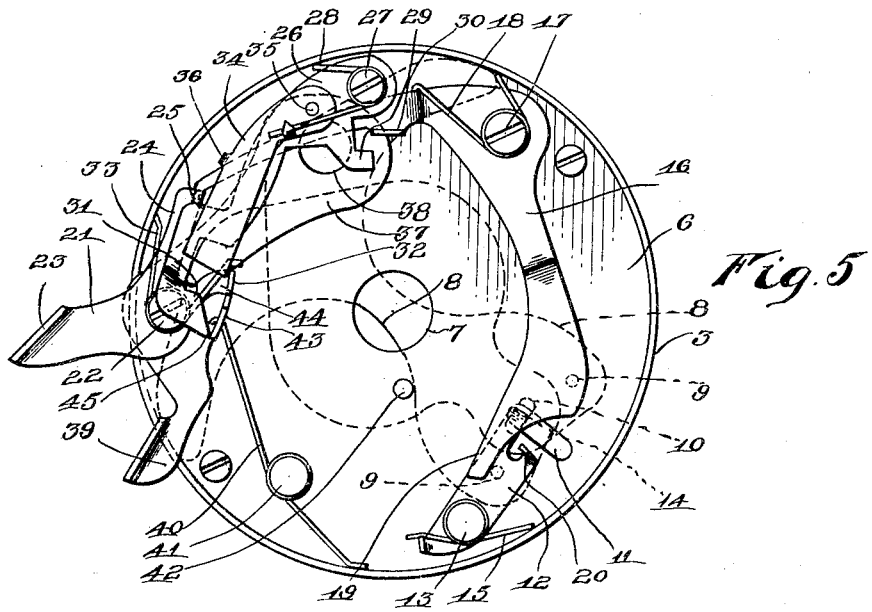
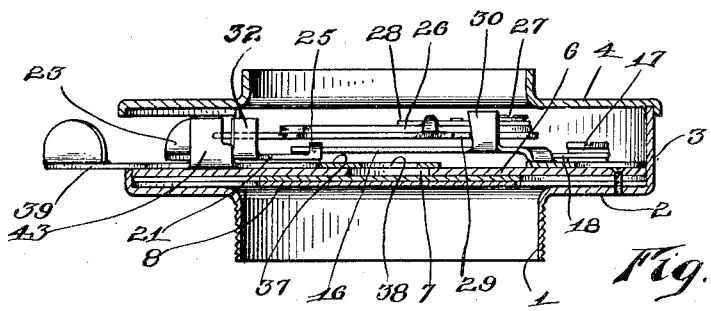
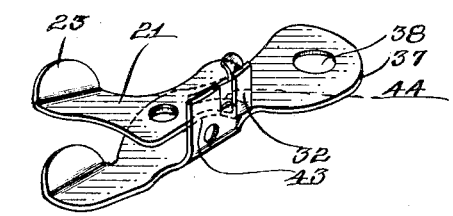

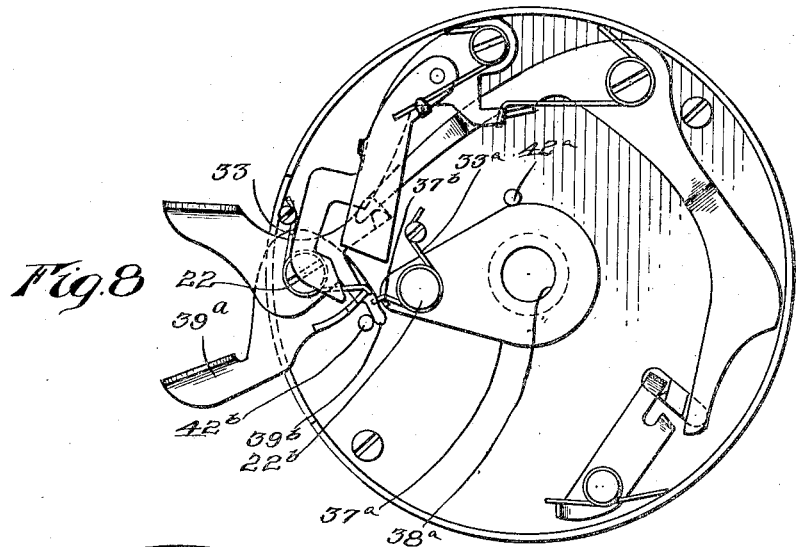
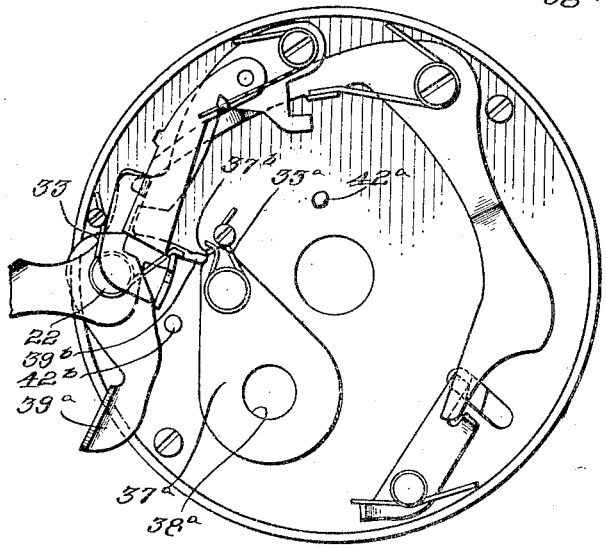
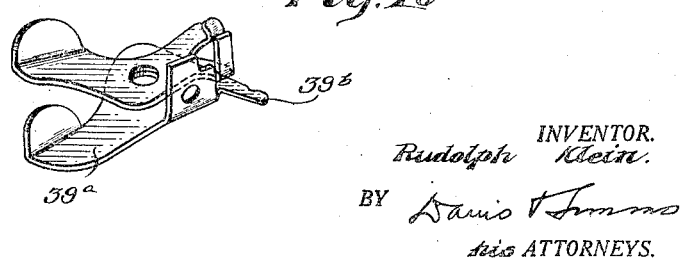

Patented Dec. 22, 1925.

1,566,542

UNITED STATES PATENT OFFICE.

RUDOLPH KLEIN, OF ROCHESTER, NEW YORK, ASSIGNOR TO ILEX OPTICAL COMPANY, OF ROCHESTER, NEW YORK, A CORPORATION OF NEW YORK.

PHOTOGRAPHIC SHUTTER.

Application filed July 16, 1924. Serial No. 726,344.

*To all whom it may concern:*

Be it known that I, RUDOLPH KLEIN, a citizen of the United States, and resident of Rochester, in the county of Monroe and State of New York, have invented certain new and useful Improvements in Photographic Shutters, of which the following is a specification.

The present invention relates to photographic shutters and more particularly to the type in which there is provided a shutter operating mechanism which effects the opening and the closing of the shutter blade and detaining means operating upon the shutter operating mechanism to hold the shutter in open position, provision also being made for varying the size of the effective aperture of the shutter. An object of this invention is to provide a controlling means for the means which varies the effective size of the exposure aperture, such controlling means having connection with the shutter operating mechanism to effect the operation of the shutter upon the adjustment of the means for controlling the effective size of the exposure aperture and said controlling means also controlling the detaining means so that the operation of the shutter corresponds with the effective size of the exposure aperture. Another object of the invention is to provide an apertured blade in connection with the exposure aperture of the shutter for reducing the effective size of said exposure aperture, said blade normally lying in a position to effect the reduction in size of the exposure aperture and having controlling means which will effect the operation of the shutter operating mechanism and will control the detaining means to prevent its operation upon the shutter operating mechanism. A still further object of the invention is to provide a photographic shutter with two actuating members one of which will effect the operation of the shutter operating mechanism and control the detaining means in such a manner as to produce the time exposure and the other of which will increase the effective area of the exposure aperture, operate the shutter operating mechanism and control the detaining means in such a manner as to produce instantaneous exposure.

To these and other ends, the invention consists of certain parts and combinations of parts, all of which will be hereinafter described: the novel features being pointed out in the appended claims.

In the drawings:

Fig. 1 is a front view of one embodiment of the invention;

Fig. 2 is an edge view;

Figure 3 is an enlarged view showing the cover plate removed to expose the shutter operating mechanism, the parts being shown in normal positions;

Fig. 4 is a view similar to Fig. 3, showing the shutter blades open;

Fig. 5 is a view similar to Fig. 3, showing the manner in which the shutter operates to effect instantaneous exposure;

Fig. 6 is a section on the line 6—6, Fig. 3;

Fig. 7 is a detail perspective view of the actuating device;

Fig. 8 is a view similar to Fig. 3 of another embodiment of the invention;

Fig. 9 shows a view of the embodiment shown in Fig. 8, illustrating the shutter being opened to effect instantaneous exposure; and Fig. 10 is a detail perspective view of the actuating device shown in Figs. 8 and 9.

In both the illustrated embodiments of the invention, a photographic shutter is employed which has a known form of shutter blade construction and a number of parts in the shutter operating mechanism which are of known construction. Referring to both embodiments, there is employed a casing member having an attaching flange 1, an annular portion 2 about the attaching flange and at right angles thereto and a side casing flange 3 concentric with the attaching flange 1 but of greater diameter than the latter. A cover member 4 is secured in place over the flange 3 by screws 5 to form the casing. Within the casing a disk 6 is arranged formed with an exposure aperture 7. Beneath this disk the shutter blades 8 are mounted, the blades, in this instance, being two in number and being pivoted at 9 at two separate points. These blades are provided with the usual slots 10 which operate opposite a slot 11 in the plate 6. An exposure lever 12, pivoted at 13 to the opposite side of the plate 6 has a laterally turned portion 14 extending into the slots 11 for effecting the simultaneous operation of the shutter blades 8. A spring 15 operates on the exposure lever in a direction to hold the blades 8 closed. Also mounted on the plate 6 is a master member 16 which is pivoted between its ends at 17 to the plate and is held normally in the position shown in Fig. 3 by a spring 18. One end 19 of this lever cooperates with a bevelled projection 20 on the exposure lever 12. To effect the opening of the blades the master member is moved from the position shown in Fig. 3 against the action of the spring 18 by a means to be described and rides over the bevelled projection 20 without affecting the movement of the exposure member or blades, the end of the lever at this time flexing laterally. On the return movement of the master member 18, the latter engages the projection 20, shifts the exposure lever to open the blades and then slides off the projection 20, due to the fact that the levers move in different arcs, permitting the exposure member to move under the action of the spring 15 and close the blades.

Operation of the master member is effected through an actuating lever 21 pivoted at 22 on the plate 6 and having a finger piece 23 on one arm by which it is operated. Another arm 24 has a laterally turned projection 25 adapted to cooperate with the end of the master lever 16, the projection 25 and the end of the master lever moving in two different arcs so that as a certain position is reached the master lever 16 slips off the projection 25 and the master member moves to normal position under the action of the spring 18.

With the end in view of controlling the return movement of the master member so as to obtain time exposure, the detaining means is provided embodying a detent 26 pivoted at 27 to the plate 6 and normally moved to the detaining position by a spring 28. This detent has a shoulder 29 thereon which is adapted to cooperate with a laterally extending projection 30 on the master lever so as to hold the master lever against complete return movement, as illustrated in Fig. 4 with the blades open. When the shutter is closed the detent rests against this projection 30 and is held away from normal position ready to pass beneath the projection 30 when the master lever is moved through the actuating lever 21. In order that the actuating lever 21 may be utilized for releasing the master lever by shifting the detent 26, the detent 26 has a shoulder 31 which, when the actuating lever is shifted to the postion shown in Fig. 4, enters behind a projection 32 on the actuating lever and prevents the actuating lever returning to normal position under the action of the spring 33. At the same time, a latch 34 pivoted at 35 to the detent 26 falls in front of the projection 32 so that when the actuating lever 21 is again depressed, it pushes against the latch 34 and shifts the detent 26 on its pivot 27 to carry the shoulder 29 out of the path of the projection 30 on the master lever, thereby freeing the master member to the action of its spring 18 and permitting the master lever to slip off of the exposure lever 12 so that the spring of the exposure lever may close the blades. In order that the latch 34 will be moved out of the path of the projection 32 against the action of the spring 28 which connects with the latch 34 to effect the movement of the latter and the detent, a laterally extending lug 36 is provided on the latch which projects into the path of one arm of the master member so that, when the master member is moved through the actuating member it engages such projection 36 and holds the latch 35 out of the path of the projection 32 until the master member 16 is freed by the actuating member 21. All of the foregoing parts and operations are old in photographic shutters. These parts or any other suitable parts may be used in connection with this invention.

In photographic shutters it is customary to vary the size of the aperture through the shutter for different types of exposures, instantaneous exposures requiring a different size of aperture than the time exposures. Prior to this invention it has been necessary through an independent operation to adjust the size of the aperture before operating the shutter blades. Through such prior construction due to the carelessness of the user of the shutter or to the lack of knowledge of its use, the adjusting of the aperture to a size corresponding to the speed of the exposure has in many instances, not been given, and as a consequence bad results in the taking of pictures have been secured.

According to this invention, provision is made for the adjustment of the size of the aperture upon the operation of the shutter. In the embodiment of the invention, illustrated in Figs. 1 to 7, the size adjusting devices for the aperture is in the form of a plate 37, provided with an aperture 38 of a size smaller than the aperture 7, this plate, in this instance, being pivoted at 22 on the pivot of the actuating lever 23 and having an actuating portion 39 on the exterior of the shutter in proximity to the actuating portion 23. A spring 40 secured to the plate 6 at 41 engages the aperture lever 37 to hold the latter normally against a stop 42 with the aperture 38 thereof aligned with the aperture 7. It is apparent that this arrangement permits a depression of the finger piece 23 without effecting the position of the lever 37 and in this way when the finger piece is depressed for time exposures, the aperture 38 will reduce the size of the aperture 7 so that the aperture 38 will be the effective aperture of the shutter.

With the purpose in view of effecting the simultaneous operation of the shutter and the adjustment of the effective aperture to the larger size opening 7 when instantaneous pictures are taken, the lever 37 has a projection 43 which cooperates with the lever 21 at 44 so that simultaneously with the depressing of the finger piece 39, the lever 21 will be actuated to effect the operation of the master member.

It is also desirable with the depression of the finger piece 39 to control the detent 26 in such a manner that it does not interfere with the free return movement of the master member under the spring 18 after the master member has been released by the actuating member 21. The controlling means or finger piece 39 of the apertured lever 37 is therefore designed to control also the detaining means of the shutter and with this end in view a lateral projection 44 in one piece with the projection 43 moves under the nose 45 on the detent 26 to prevent the detent swinging into the path of the master member upon the depression of the controlling means or finger piece 39 of the aperture size controlling means or blade 37. It is thus apparent that the depression of the lever 39 not only effects an increase in size of the aperture of the shutter but it effects the operation of the shutter mechanism to produce the opening and closing movement of the shutter blades and controls the detaining means to prevent its operation upon the master member so that an instantaneous exposure may be effected.

In the embodiment of the invention shown in Figs. 8 and 9, the parts are the same except that the apertured exposure lever 37ª with the exposure aperture 38ª is pivoted at 22ᵇ independently of the pivot 22 of the controlling lever 39ᵇ. In addition a spring 33ª independent of the spring 33 acts on the exposure blade 37ª to hold the latter against the stop 42ª, whereas the spring 33ª holds a notch 39ᵇ on the lever 39ª against a stop 42ᵇ. The notch 39ᵇ also forms parts of an operative connection of the aperture lever 37ª, the other part being a lateral projection 37ᵇ which also forms an abutment for one end of the spring 33ª.

From the foregoing it will be seen that there has been provided a photographic shutter with means associated with the shutter for varying the size of the exposure aperture preferably in the form of an apertured blade which in one position uncovers the main aperture of the shutter and in another position reduces the size of such aperture. A controlling means is provided for the means of varying the size of the aperture which means when actuated effects the operation of the shutter operating mechanism and also controls the detaining means for the shutter operating mechanism so that the operation of the shutter corresponds to the size of the effective aperture. In this instance, the size controlling means for the aperture normally lies in a position to reduce the size of the aperture and the shutter may be operated to obtain time exposures without destroying the adjustment of the size controlling means. The controlling means for the size controlling means effects the operation of the latter to increase the size of the effective aperture, effects the operation of the shutter operating mechanism, and controls the detaining means so that the latter does not interfere with the operation of the shutter operating mechanism to effect instantaneous exposure.

What I claim as my invention and desire to secure by Letters Patent is:

1. A photographic shutter having a main exposure aperture, a blade having an exposure aperture of smaller size than the main exposure aperture and adapted to reduce the size of the main exposure aperture, shutter blades controlling said apertures, operating mechanism for the shutter blades, detaining means for said operating mechanism for obtaining time exposure, and controlling means for the exposure blade, having connection with the detaining means for holding the latter out of cooperation with the shutter operating mechanism when the exposure blade is shifted out of cooperation with the main exposure aperture.

2. A photographic shutter having a main exposure aperture, a blade having an exposure aperture of smaller size than the main exposure aperture and adapted to reduce the size of the main aperture, shutter blades controlling said apertures, operating mechanism for the shutter blades, detaining means for holding the blades open, and controlling means for the apertured blade arranged to operate the operating mechanism for the shutter blades and holding the detaining means out of detaining position when the apertured blade is shifted out of cooperation with the main exposure aperture.

3. A photographic shutter having a main exposure aperture, a blade having an exposure aperture of smaller size than the main exposure aperture and adapted to reduce the size of the main exposure aperture, shutter blades controlling said exposure apertures, operating mechanism for the shutter blades having an actuating member, detaining means for obtaining time exposures released by the actuating lever of the operating mechanism, and an actuating lever for the apertured blade having connection with the actuating lever of the operating mechanism to shift said actuating lever but to permit said actuating lever to be moved independently of the actuating lever of the apertured blade, said actuating lever for the apertured blade also having connection with the detaining means for holding said means out of detaining position.

4. A photographic shutter having a main exposure aperture, a blade having an aperture of smaller size than the main exposure aperture and adapted to reduce the size of the main exposure aperture, shutter blades controlling said apertures, an exposure member connected to the shutter blades, a master member movable in one direction independently of the exposure member and in the other direction to shift the exposure member to effect the opening and the closing of the shutter blades, detaining means for holding the shutter blades in open position, an actuating lever for the master member having provision for shifting the detaining means out of detaining position, and an actuating member for moving the aperture blade away from the main exposure aperture, said last mentioned actuating lever having connection with the actuating lever of the master member to effect the operation of said master member actuating lever to move independently thereof, said apertured blade actuating lever also having connection with the detaining means for holding the latter out of detaining position when the apertured blade is shifted out of cooperative relation with the main exposure aperture by the apertured blade actuating lever.

5. A photographic shutter having an exposure aperture, shutter blades for the aperture, shutter operating mechanism, means normally associated with the exposure aperture to reduce the effective size thereof, and connection between said means and the shutter blade operating mechanism for causing said means to be operated to increase the effective size of said exposure aperture when the shutter blade mechanism is operated for instantaneous exposure.

6. A photographic shutter having a main exposure aperture, shutter blades for the main aperture, shutter blade operating mechanism, a blade having an exposure aperture of smaller size than the main exposure aperture normally lying over the main exposure aperture, and connected with the shutter blade operating mechanism to be automatically shifted away from such position when the shutter blade operating mechanism is operated for instantaneous exposure, and detaining means for holding the shutter blades open, held against operation when the shutter operating means is operated for instantaneous exposure.

7. A photographic shutter having an exposure aperture, shutter blades, operating mechanism for the shutter blades, detaining means for holding the blades open, and two actuating devices, one of which operates the shutter operating mechanism and controls the detaining means to effect exposure, and the other of which operates the shutter operating mechanism and controls the detaining means for effecting instantaneous exposure, and means for changing the effective size of the exposure aperture controlled by one of said actuating devices.

8. In a photographic shutter having an exposure aperture, shutter blades, operating mechanism for the shutter blades, detaining means for holding the blades open, a blade having an aperture smaller than the exposure aperture of the shutter for changing the effective size of the shutter exposure aperture, said blade having one position for time exposure and another position for instantaneous exposure, and means for effecting the movement of said apertured blade having controlling connection with said detaining means.

RUDOLPH KLEIN.